United States Patent
Masazumi (10) Patent No.: US 7,462,834 B2
(45) Date of Patent: Dec. 9, 2008

(54) RADIATION IMAGE PICKUP APPARATUS

(75) Inventor: Naoki Masazumi, Kobe (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 11/508,580

(22) Filed: Aug. 23, 2006

(65) Prior Publication Data

US 2007/0045552 A1 Mar. 1, 2007

(30) Foreign Application Priority Data

Aug. 30, 2005 (JP) ............................... 2005-249053

(51) Int. Cl.
*G01T 1/24* (2006.01)
(52) U.S. Cl. ................................. 250/370.09
(58) Field of Classification Search ............. 250/370.09
See application file for complete search history.

(56) References Cited

U.S. PATENT DOCUMENTS

| 7,079,189 B2* | 7/2006 | Tsujii et al. ................. 348/372 |
| 2002/0159567 A1* | 10/2002 | Sako et al. ................... 378/117 |
| 2003/0095628 A1* | 5/2003 | Nascetti et al. ............ 378/98.8 |
| 2003/0223540 A1* | 12/2003 | Hayashida et al. ......... 378/98.8 |
| 2004/0258204 A1* | 12/2004 | Nokita et al. ................. 378/91 |

FOREIGN PATENT DOCUMENTS

JP 2002-165142 6/2002

* cited by examiner

*Primary Examiner*—David P. Porta
*Assistant Examiner*—Marcus H Taningco
(74) *Attorney, Agent, or Firm*—Brinks Hofer Gilson & Lione (57) ABSTRACT

To provide a low power consuming image pickup apparatus, for a radiation image pickup apparatus using an FPD, which can sufficiently initialize dark current component stored in the photoelectric conversion element, specifically electric charges trapped at the trap level. After the power to the radiation image pickup apparatus has been turned on, a readout circuit 24 stops operating in the standby state, thin-film transistors 2 and 20*a*, 20*b*, ..., 20*c* are turned on, and the first bias circuit 25 and the second bias circuit 26 operate thereby initializing the photoelectric conversion element 3.

18 Claims, 9 Drawing Sheets

RADIATION IMAGE PICKUP APPARATUS

This application is based on Japanese Patent Application No. 2005-249053 filed on Aug. 30, 2005, in Japanese Patent Office, the entire content of which is hereby incorporated by reference.

TECHNICAL FIELD

The present invention relates to a radiation image pickup apparatus.

BACKGROUND

Conventionally, a film screen system which uses an intensifying screen in combination with radiographic film has been used for picking up radiation images. According to this method, a radiation ray that has transmitted through an subject to be photographed and thereby contains information about the subject's internal condition is converted by an intensifying screen to visible light in proportion to the radiation intensity, and then the radiographic film is exposed to the visible light, thereby a radiation image is formed on the film. However, such a film system is laborious because of the necessity of a development process; accordingly it takes time for a doctor to finally receive a radiographed radiation image.

Due to recent technological progress, in the medical industry, there is an increasing request for receiving radiation image information as a direct electrical signal without using radiographic film. That is, a radiation image pickup apparatus has been introduced which includes a semiconductor sensor that can directly convert a radiation ray into an electrical signal in proportion to the radiation intensity; or includes an indirect-type semiconductor sensor that converts a radiation ray into visible light by fluorescent substance in proportion to the radiation intensity and then converts the visible light into an electrical signal by a photoelectric conversion element; and further includes a flat panel detector (hereafter referred to as FPD) which reads out the converted electrical signal by a circuit that uses an amorphous silicon thin-film transistor (a-TFT).

Figure 8:
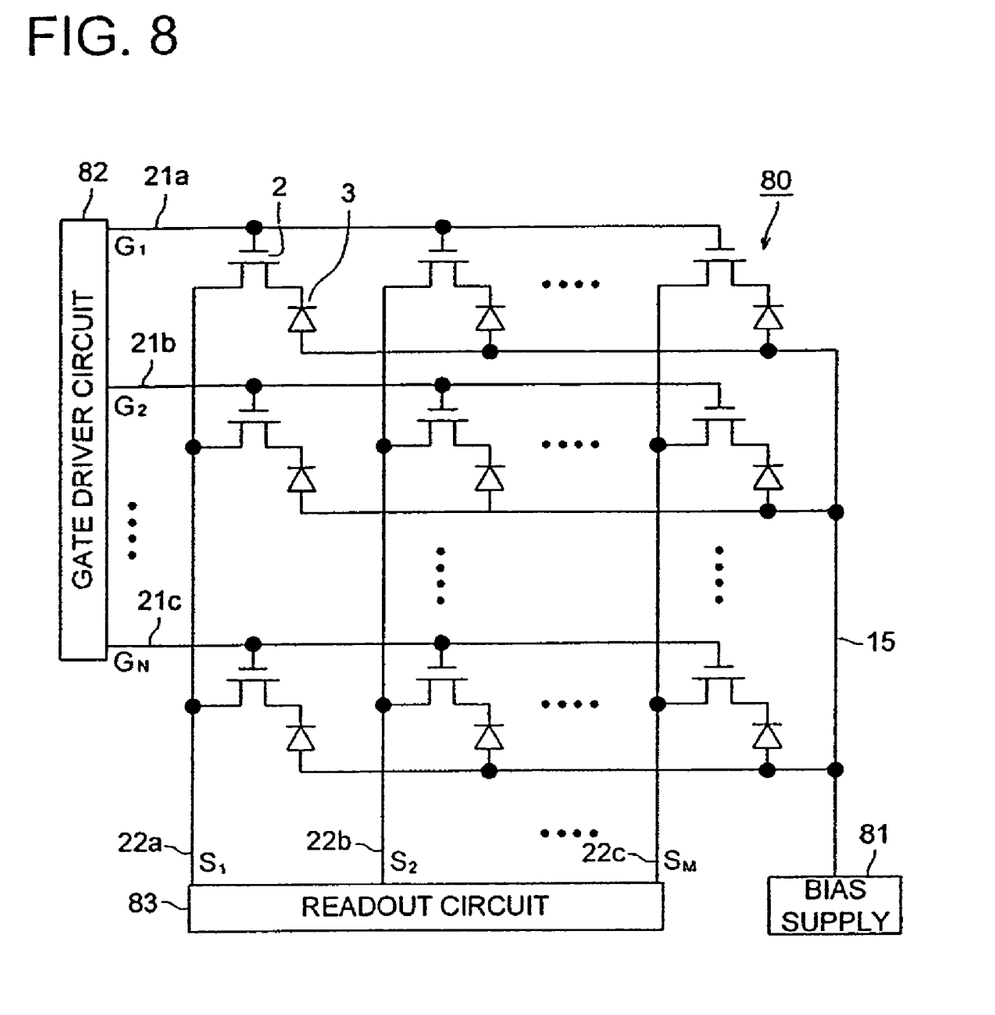
FIG. 8 shows an FPD's circuit and peripheral circuitry according to a conventional technology.

The FPD will be described with reference to FIG. 8 and FIG. 9.

Generally, an indirect-type FPD is configured such that a fluorescent plate which converts a radiation ray into visible light, a photoelectric conversion element which converts visible light into an electrical signal, a TFT switch circuit, and wires which connect those elements are formed on a glass substrate. FIG. 8 shows the FPD 80 circuit and peripheral circuitry. In FIG. 8, number 3 represents a photoelectric conversion element that uses a PIN-type photodiode, and number 2 represents an amorphous silicon thin-film transistor wherein its drain electrode is connected to a readout line 22a, 22b . . . 22c, its source electrode is connected to the cathode of the photoelectric conversion element 3, and its gate electrode is connected to a gate line 21a, 21b and 21c. The anode of the photoelectric conversion element 3 is connected to a bias line 15 which is connected to a bias circuit 81, and negative bias voltage is applied. Gate lines 21a, 21b and 21c are connected to the output terminals $G_1, G_2, \ldots G_N$ of the gate driver circuit 82, respectively, that functions as a scanning section; and readout lines 22a, 22b . . . 22c are connected to the output terminals $S_1, S_2 \ldots S_M$ of the readout circuit 83, respectively. In this FPD 80, a combination of one photoelectric conversion element 3 and one thin-film transistor 2 constitutes one pixel, and altogether pixels of N lines multiplied by M columns (N and M are positive integers and M, $N \geq 2$) are included.

The output terminals $G_1, G_2, \ldots G_N$ of the gate driver circuit 82 are connected to the gate lines 21a, 21b, . . . 21c, respectively, and the gate driver circuit 82 outputs positive voltage in sequence thereby scanning the gate lines 21a, 21b, . . . 21c. The output terminals $S_1, S_2, \ldots S_M$ of the readout circuit 83 are connected to the readout lines 22a, 22b, . . . 22c, respectively, and the readout circuit 83 outputs positive voltage. Furthermore, each of the output terminals $S_1, S_2, \ldots S_M$ of the readout circuit 83 includes a charge-voltage conversion circuit which converts an amount of electric charges flowing out to the readout line 22a, 22b, . . . 22c into voltage.

The fluorescent plate (not shown) is configured such that it covers the above FPD 80 and it allows visible light generated on the fluorescent plate by an exposure to radiation to enter the photoelectric conversion element 3.

Next, operations of the above FPD will be described.

Figure 9:
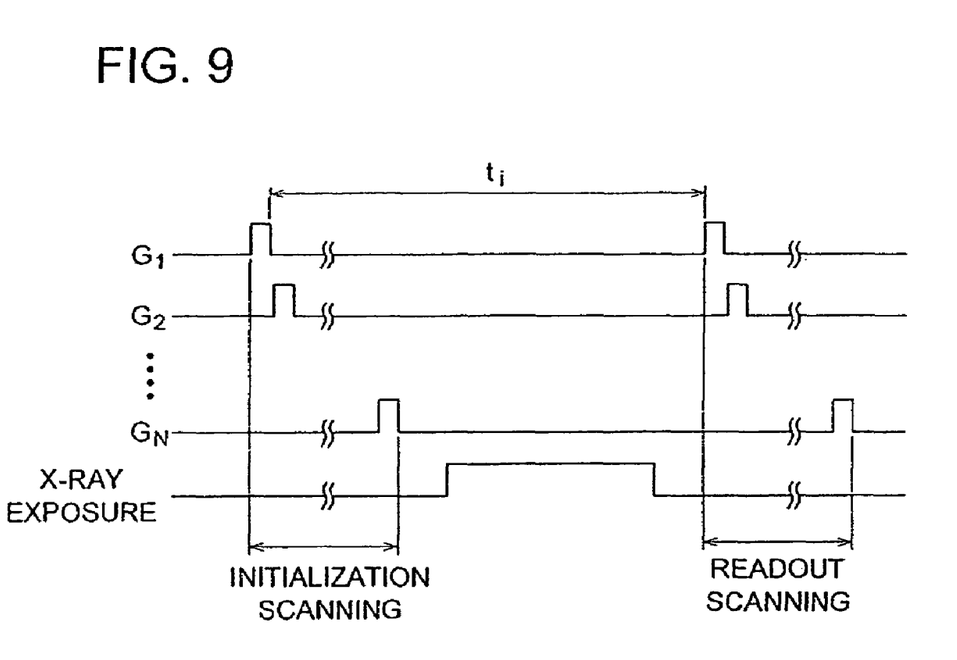
FIG. 9 shows a timing chart of the operation of an FPD according to a conventional technology.
Figure 10:
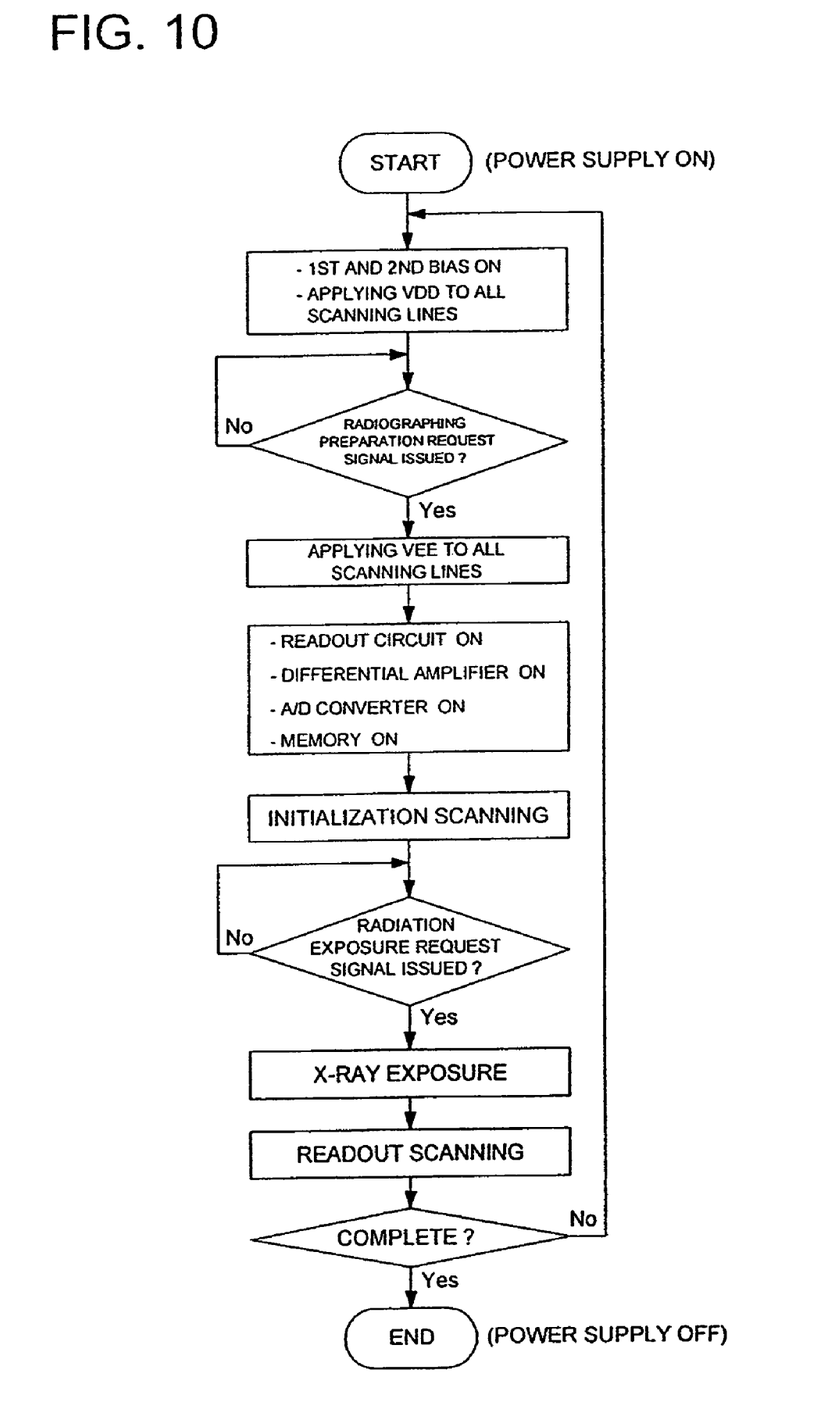
FIG. 10 shows an operation flow of a radiation image pickup apparatus according to the first embodiment of the present invention.

FIG. 9 is a timing chart that shows operations of the FPD 80. In FIG. 9, waveforms denoted by $G_1, G_2 \ldots G_N$ show voltages of the output terminals $G_1, G_2 \ldots G_N$ of the gate driver circuit 82, respectively. When the voltage of the gate lines 21a, 21b, . . . 21c becomes high, all of the thin-film transistors 2 connected to the gate line are turned on. At this point in time, because the output terminals $S_1, S_2, \ldots S_M$ of the readout circuit 83 output positive voltage to the readout lines 22a, 22b, . . . 22c, the photoelectric conversion elements 3 connected to the activated thin-film transistors 2 are reversely biased, thereby charging the capacity of the photoelectric conversion elements 3. At this point in time, charging current that flows into the photoelectric conversion element 3, which is an electric charge that flows into the readout line 22a, 22b, . . . 22c from the output terminal $S_1, S_2, \ldots S_M$ of the readout circuit 83, is converted from an electric charge into voltage by the readout circuit 83 and read out as a voltage. When the voltage of the gate lines 21a, 21b, . . . 21c becomes low, all of the thin-film transistors 2 connected to the gate lines are turned off, the charging voltage of the photoelectric conversion elements 3 connected to the thin-film transistors 2 is maintained.

An operation indicated as "initialization scanning" in FIG. 9 is a scanning operation for initializing the FPD by charging all of the photoelectric conversion elements 3 in preparation of picking up radiation images. A waveform indicated as "X-ray exposure" in FIG. 9 shows an exposure to a radiation ray, the period during which the voltage is high is the period when radiation exposure is being conducted. As shown in FIG. 9, radiation exposure is conducted after the initialization scanning of the FPD 80 has been finished. When the radiation exposure process starts, a fluorescent plate that is exposed to radiation starts to emit fluorescent light, and an electron-hole pair is generated in the photoelectric conversion element 3 that has received the fluorescent light, thereby discharges electric charges stored therein. Accordingly, electric charges that have been stored in the photoelectric conversion element 3 decrease by an amount equivalent to the number of electron-hole pairs generated.

After the radiation exposure process, readout scanning is conducted as shown in FIG. 9. The voltage that has been converted from electric charge and read out from the readout circuit 83 during the readout scanning operation is equivalent to the amount of electric charges that have been discharged from the photoelectric conversion element 3 during the radiation exposure operation. Thus, a radiation image entered onto a fluorescent plate is two-dimensionally read out as a voltage.

"$t_i$" in FIG. 9 represents integration time; electron-hole pairs caused by visible light generated by the fluorescent plate discharge electric charges stored in the photoelectric conversion element 3 by the amount equivalent to that of generated electron-hole pairs, and the electron-hole pairs generated during this period are substantially integrated by the photoelectric conversion element 3. It is preferable that the integration time should include the radiation exposure period and the fluorescent plate's light-emitting period.

With regard to the operation state of the FPD, two states can be considered: the operating state when voltage is being applied to the FPD and the standby state when voltage is not applied. In this case, in the standby state, the electric charges are trapped at the photoelectric conversion element's trap level by thermoelectrons and become dark current components. For this reason, when using the FPD, at the time the status is switched to the operating state, the photoelectric conversion element is initialized (reset operation) to discharge electric charges stored therein. This is done by applying reverse bias to the photoelectric conversion element for a predetermined time. At this point in time, the amount of current that flows as the result of the application of reverse bias gradually decreases as time goes by. This current results in noise when an image is radiographed, and sometimes it is necessary to apply reverse bias for several tens of seconds until the amount of current decreases to the degree that does not cause problem with picking up images.

In a conventional image pickup apparatus, because the power is supplied from outside by a cable, in order to apply reverse bias full-time to the photoelectric conversion element, the FPD has to be scanned all the time, or an electric charge readout circuit connected to the FPD has to be operated all the time while all of the switching thin-film transistors connected to the photoelectric conversion elements are turned on.

However, with this kind of operation method, there is a problem that the amount of current consumed tends to become great. That is, each readout line of the readout circuit uses an operational amplifier circuit. For example, if each operational amplifier consumes 3 mW of power, since the FPD generally has 2000 readout lines, the total amount of power consumption amounts to 6 W, resulting in 48 Wh a day when those amplifiers are operated 8 hours a day.

If the equivalent amount of power is to be provided by a battery, and the power density of a general lithium-ion secondary battery is 150 Wh/kg, a battery of at least 300 g is necessary to simply maintain the initializing state. If the battery capacity is increased for the cases when the operating time is extended or to take into consideration that the battery's ability to store energy may deteriorate over time, the required weight of the battery increases. When a portable image pickup apparatus that uses an FPD is assumed, the weight of the battery becomes a key factor. If some of the battery capacity has to be allocated to the power consumed during the standby state, feasibility of a portable apparatus that uses a battery power supply significantly decreases. Furthermore, other than the weight of the battery, a problem arises in that heat generated by the readout circuit increases the FPD's dark current or fluctuates the offset.

As an example of a conventional technology that copes with these problems, there is a disclosed technology wherein two power supply circuits are separately provided: one as a power supply for applying bias to an FPD and the other as a power supply for a readout circuit; and a power supply for bias application is first operated according to the generation of the radiographing preparation request signal to apply bias to the photoelectric conversion element thereby initializing the FPD; and a power supply for the readout circuit is operated after the X-ray exposure process so as to reduce power consumption (see patent document 1). [Patent document 1] Japanese Laid-Open Patent Publication No. 2002-165142.

However, according to the technology disclosed in patent document 1, only a period of time from the generation of the radiographing preparation request signal to the start of X-ray exposure can be used for initializing an FPD. Usually, this time period is only several seconds which is too short because several tens of seconds are usually required to fully initialize an FPD. For this reason, dark current components stored in the photoelectric conversion element, specifically electric charges trapped at the trap level, are not sufficiently discharged, which makes it difficult to sufficiently reduce noise components of the picked up image.

SUMMARY

Therefore, an objective of the present invention is to provide an image pickup apparatus using an FPD, which can sufficiently initialize dark current components stored in the photoelectric conversion element, specifically electric charges trapped at the trap level and consume as little power as possible.

In view of forgoing, one embodiment according to one aspect of the present invention is a radiation image pickup apparatus, comprising:

a plurality of conversion elements for directly or indirectly converting a radiation ray to an electric signal a plurality of first switches, each one end of which is connected to each of the plurality of the conversion elements, the first switches together with conversion elements constituting pixels and being arranged in a matrix;

a plurality of readout lines which are connected to the other ends of the first switches of the pixels in a same column of the pixels;

a plurality of scanning lines for scanning to control the first switches of the pixels in a same row of the plurality of the pixels;

a plurality of second switches, each one end of which is connected to each of the plurality of the readout lines, the other end of the second switch being supplied with a bias voltage for resetting the pixels; and a reset line for controlling the second switches.

According to another aspect of the present invention, another embodiment is a radiation image pickup apparatus, comprising:

a plurality of conversion elements for directly or indirectly converting a radiation ray to an electric signal a plurality of first switches, each one end of which is connected to each of first electrodes of the plurality of the conversion elements, the first switches together with conversion elements constituting pixels and being arranged in a matrix;

a readout line which is connected to the other ends of the first switches of the pixels in a same column of the plurality of pixels;

a scanning line which is connected to control electrodes of the first switches of the pixels in a same row of the pixels;

a bias generation section which is connected to second electrodes of the conversion elements and supplies a bias voltage;

a readout section which is connected to the readout line and reads out electric charge by converting the electric charge to voltage, and an intermittent operation control section for, in a standby state, making the readout section operate intermittently.

DETAILED DESCRIPTION OF THE PREFERRED EMBODIMENT

Embodiments of the present invention will be described with reference to the drawings.

First Embodiment

Figure 1:
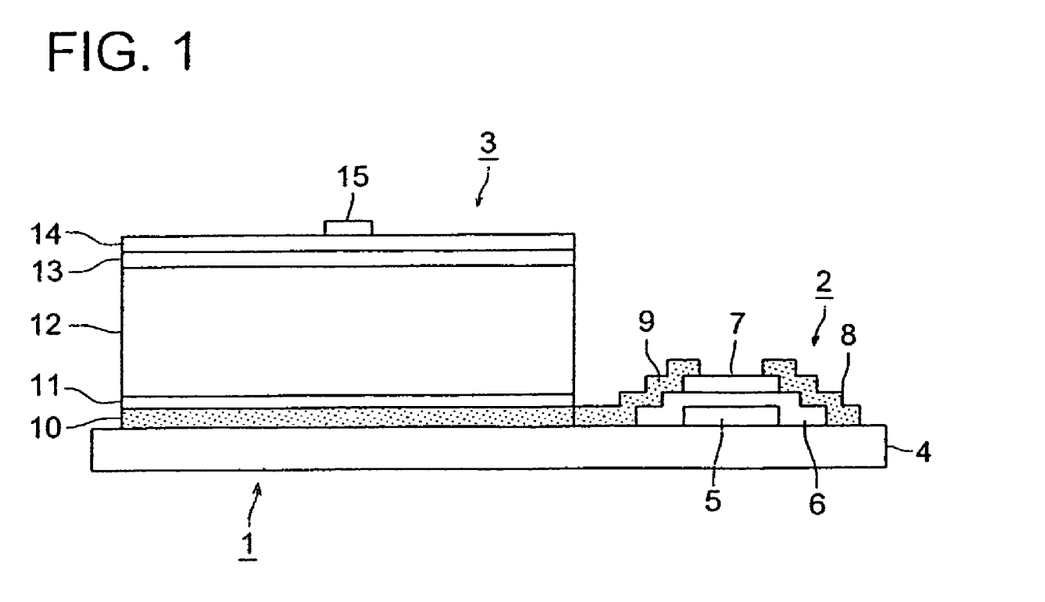
FIG. 1 is a cross-sectional view of an FPD according to a first embodiment of the present invention.

FIG. 1 is a cross-sectional view of an FPD 1 used for an image pickup apparatus according to an embodiment of the present invention. Herein, an indirect-type FPD will be taken as an example, but an FPD is not intended to be limited to the indirect-type FPD. A thin-film transistor 2 and a photoelectric conversion elements 3 that function as first switches are formed on the surface of a substrate 4, such as a glass substrate.

A photoelectric conversion element 3 comprises a cathode electrode 10, n-type amorphous silicon semiconductor layer 11, i-type amorphous silicon semiconductor layer 12, p-type amorphous silicon semiconductor layer 13 and an optically transparent anode electrode 14 made of, for example, ITO (tin-doped indium oxide). A thin-film transistor 2 comprises a gate electrode 5, gate oxide film 6, amorphous silicon semiconductor layer 7, drain electrode 8 and a source electrode 9. The cathode electrode 10 is connected to the source electrode 9, and the anode electrode 14 is connected to a bias line 15. A scintillator layer (not shown), which emits visible light when it is exposed to the X-ray, is formed on the anode electrode 14 side of the photoelectric conversion element 3 so that the scintillator layer covers the thin-film transistor 2 and the photoelectric conversion element 3.

Figure 2:
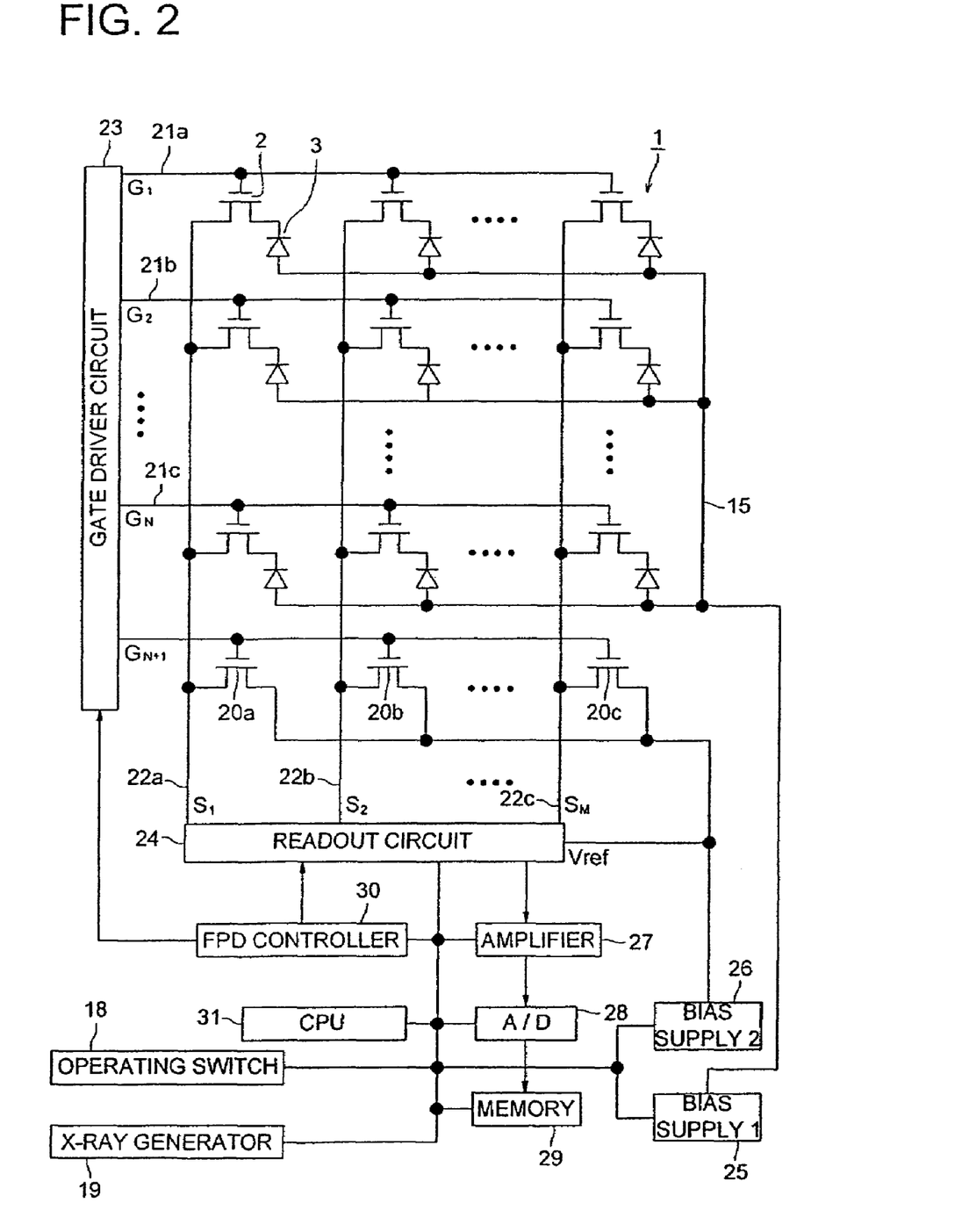
FIG. 2 shows the configuration of a radiation image pickup apparatus according to the first embodiment of the present invention.

FIG. 2 shows the configuration of an image pickup apparatus and an FPD 1 according to an embodiment of the present invention. The same alphanumeric is assigned to an element in FIG. 2 that functions in the same manner as the element shown in FIG. 1 and FIG. 8.

In FIG. 2, a photoelectric conversion element 3 is configured by a PIN-type photodiode, and a cathode electrode that functions as one electrode (a first electrode) thereof is connected to a source electrode that functions as one end of an amorphous silicon thin-film transistor 2 which functions as a first switch. A drain electrode that functions as the other end of the thin-film transistor 2 is connected to a readout line $22a$, $22b$, ... $22c$, and a gate electrode that functions as a control electrode is connected to a gate line $21a$, $21b$, ... $21c$. An anode electrode that functions as the other electrode (a second electrode) of the photoelectric conversion element 3 is connected to a bias line 15 which is connected to a first bias circuit 25 that functions as a first bias generation section. The first bias circuit applies negative voltage (for example, −5 V) with respect to a ground potential to the bias line 15. Gate lines $21a$, $21b$, ... $21c$ that function as scanning lines are connected to the output terminals $G_1$, $G_2$, ... $G_N$ of the gate driver circuit 23 that functions as a scanning section; and readout lines $22a$, $22b$, ... $22c$ are connected to the output terminals $S_1$, $S_2$, ... $S_M$ of the readout circuit 24 that functions as a readout section. In this FPD 1, a combination of one photoelectric conversion element 3 and one thin-film transistor 2 constitutes one pixel, and altogether pixels of N lines multiplied by M columns (N and M are positive integers and M, N≧2) are included.

Gate lines $21a$, $21b$, ... $21c$ are connected to the output terminals $G_1$, $G_2$, ... $G_N$ of the gate driver circuit 23, respectively, which sequentially outputs positive voltage to scan the gate lines $21a$, $21b$, ... $21c$. Readout lines $22a$, $22b$, ... $22c$ are connected to the output terminals $S_1$, $S_2$, ... $S_M$ of the readout circuit 24, respectively, which outputs positive voltage. Furthermore, each of the output terminals $S_1$, $S_2$, ... $S_M$ of the readout circuit includes an electric charge-voltage conversion circuit that converts the amount of electric charges flowing out to a readout line $22a$, $22b$, ... $22c$ into voltage.

The fluorescent plate (not shown) is configured such that it covers the above-mentioned FPD 1 and visible light that has been generated by a fluorescent plate as the result of the exposure to radiation enters into the photoelectric conversion element 3.

In FIG. 2, an FPD 1 of this embodiment includes thin-film transistors $20a$, $20b$, ..., $20c$ that function as reset section (second switch) for initialization. The drain electrode that functions as one electrode (one end) of the thin-film transistor $20a$, $20b$, ... $20c$ is connected to each of the readout lines $22a$, $22b$, ..., $22c$; the source electrode that functions as another electrode (the other end) is connected to the second bias circuit 26 which functions as a second bias generation section; and the gate electrode that functions as a control electrode is connected to a reset line 16 which is connected to the output terminal $G_{N+1}$ of the gate driver circuit 23. Moreover, the proportion of the gate width of the thin-film transistor $20a$, $20b$, ..., $20c$ to the gate length is made smaller than the proportion of the gate width of the thin-film transistor 2 to the gate length. The second bias circuit applies positive voltage (for example, +5 V) with respect to a ground voltage to the thin-film transistor which functions as a second switch.

In this embodiment, the number of output terminals of the gate driver circuit 23 is one larger than the number of pixel lines. This is to control the second switch via the reset line 16. As a first bias circuit 25 and a second bias circuit 26, a combination of a low-power consuming DC-DC converter with a linear regulator can be used.

Both the reset signal, which reflects an initialization state of the operational amplifier of the readout circuit 24, and the readout signal are outputted from the readout circuit 24 and are differentially amplified by a differential amplifier 27, inputted into an A/D converter 28, converted into digital data, and then stored in the memory 29. The FPD controller 30 generates the pulse signal necessary for controlling the gate driver circuit 23, readout circuit 2 and the A/D converter 28. The CPU 31 is connected to the readout circuit 24, FPD controller 30, A/D converter 28, first bias circuit 25, second bias circuit 26 and the memory 29, thereby controlling those devices.

Number 18 denotes an operating switch which is operated by a radiographer (not shown) to generate the radiographing e preparation request signal (described later) and the radiation exposure request signal (described later) from the CPU 31.

Number 19 denotes an X-ray generator which operates in response to the radiographing preparation request signal and the radiation exposure request signal sent from the CPU 31.

Figure 3:
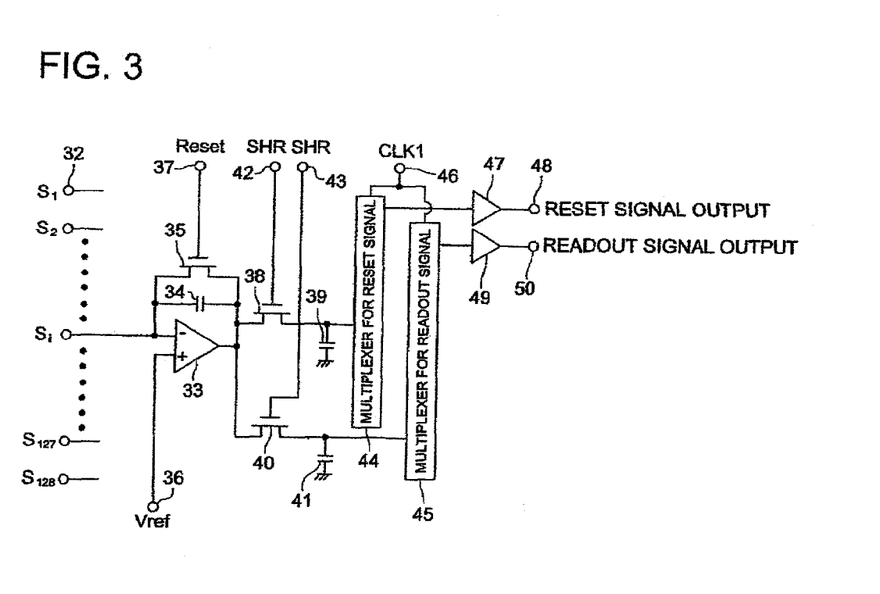
FIG. 3 shows the configuration of a readout IC according to the first through third embodiments of the present invention.

FIG. 3 shows the configuration of the readout IC of the readout circuit 24. The readout circuit 24 includes the necessary number of readout ICs that will be described below.

For example, the readout IC has input terminals 32 for 128 channels, and each channel comprises an operational amplifier 33, integration capacitor 34, reset transistor 35, sample transistors 38 and 40, and hold capacitors 39 and 41. An integration capacitor 34 and a reset transistor 35 are connected between the output terminal of the operational amplifier 33 and the inverting input terminal thereof, thereby constituting an integration circuit together with an operational amplifier 33. Due to the integration circuit, the readout circuit 24 integrates current flowing through the readout lines 22a, 22b, ..., 22c and converts the value into a voltage signal. The ON/OFF state of the reset transistor 35 is controlled by means of a voltage applied to the Reset terminal 37.

A sample transistor 38 and a hold capacitor 39 constitute a resetting sample-hold circuit, which holds the output of the operational amplifier 33 immediately after the integration capacitor 34 has been reset. A sample transistor 40 and a hold capacitor 41 constitute a signaling sample-hold circuit, and the hold capacitor 41 holds voltage (output voltage of the operational amplifier 33) that has been integrated by the integration capacitor 34. The ON/OFF state of the sample transistors 38 and 40 are controlled by mean of voltages applied to the SHR terminal and the RSH terminal respectively. A reference voltage is inputted from the Vref terminal 36 and the input terminal 32 holds the same amount of voltage as the Vref terminal 36.

An output of each channel's resetting sample-hold circuit is inputted into a reset signal multiplexer 44 where a 1-channel signal is selected and outputted to an amplifier 47. An output of the amplifier 47 is outputted as a reset signal from the reset signal output terminal 48. An output of each channel's signaling sample-hold circuit is inputted into a readout signal multiplexer 45 where a 1-channel signal is selected and outputted to an amplifier 49. An output of the amplifier 49 is outputted as a readout signal from the readout signal output terminal 50. The reset signal multiplexer 44 and the readout signal multiplexer 45 switch signals to be selected according to a clock pulse inputted from the CLK1 terminal 46.

Figure 4:
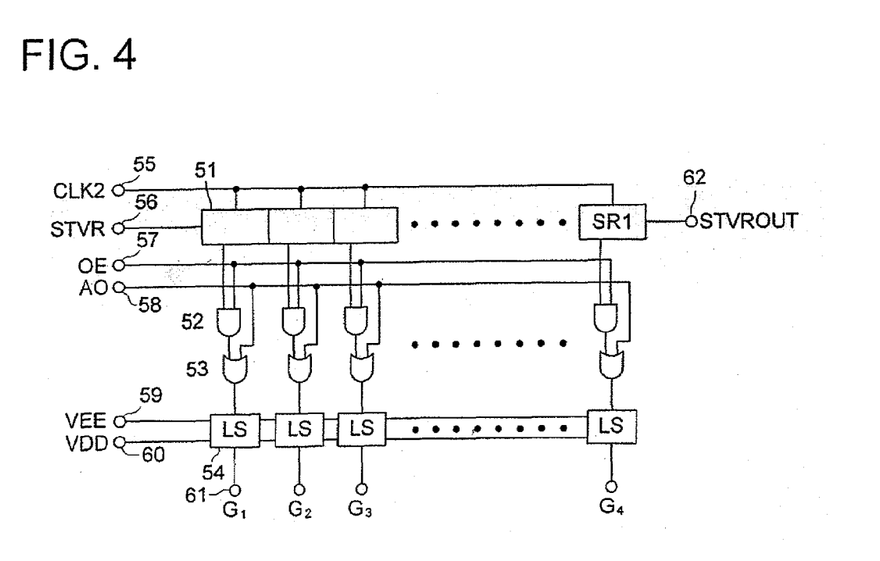
FIG. 4 shows the configuration of a gate driver IC according to the first through third embodiments of the present invention.

FIG. 4 shows the configuration of a gate IC of the gate driver circuit 23. The gate driver circuit 23 includes the necessary number of gate ICs (described later) that are connected to one another.

For example, the gate IC comprises 256 shift registers SR1, SR2 ..., SR256 that are linked, and the output of each shift register 51 is outputted to the output terminal 61 via the AND circuit 52, OR circuit 53 and the level shifter 54.

The CLK2 terminal 55, which is connected to the shift register 51, sequentially switches a high or low signal inputted from the STVR terminal 56 according to the clock signal inputted from the CLK2 terminal 55. For example, when a high signal equivalent to one pulse of the clock signal is inputted into the STVR terminal, the high signal shifts on a shift register 51 thereby making any one of the output terminals $G_1, G_2, \ldots G_N$ high and scans the gate lines 21a, 21b, ... 21c.

Voltage VEE is supplied to the circuit's VEE terminal 59 and voltage VDD is supplied to the VDD terminal 60, and the level shifter 54 outputs voltage VEE with regard to a low input and voltage VDD with regard to a high input. Although voltage VEE and voltage VDD should be determined according to characteristics of the thin-film transistor 2 used for the FPD, when considering characteristics of a standard thin-film transistor, −5 V and 25 V seem to be appropriate, respectively.

An OE terminal 57 is connected to one input terminal of the AND circuit 52 and an AO terminal 58 is connected to one input terminal of the OR circuit 53, and by inputting a low signal into the OE terminal 57, it is possible to apply VEE voltage to all of the output terminals 61. Furthermore, by inputting a high signal into an AO terminal 58, it is possible to apply VDD voltage to all of the output terminals 61.

The STVROUT 62 is an output of a shift register 51, and when gate ICs are linked, this terminal can be connected to the STVR of an adjacent gate IC.

Figure 5:
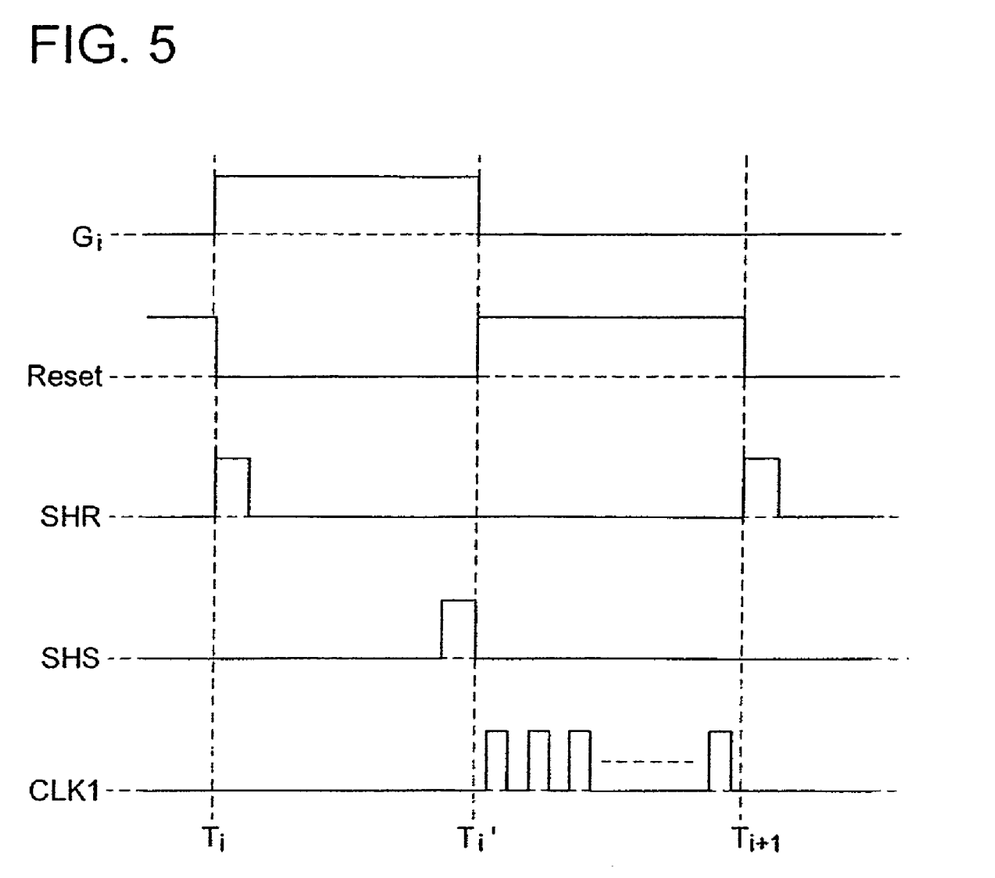
FIG. 5 is a timing chart of the signal of a readout circuit of a radiation image pickup apparatus according to the first through third embodiments of the present invention.

FIG. 5 shows a timing chart of the signal supplied to the readout circuit 24 and the output signal of the output terminal 61. In FIG. 5, $G_i$ denotes the signal outputted from the i-th terminal of the gate drive IC's output terminal 61; and Reset, SHR, SHS, and CLK1 show signals inputted into the Reset terminal 37, SHR terminal 42, SHS terminal 43 and the CLK1 terminal 46, respectively.

In FIG. 5, the readout circuit 24 reads out the electric charge of the pixel of the i-th line of the FPD 1 during the period between timing $T_i$ and $T_{i+1}$. At timing $T_i$, the $G_i$ output of the output terminal 61 becomes high selecting the pixel of the i-th line of the FPD 1, and the output of the Reset terminal 37 becomes low turning the reset transistor 35 off, thereby starting the integration of the integration capacitor 34. At timing $T_i$, the output of the SHR terminal 42 first becomes high and then becomes low, and the hold capacitor 39 holds a reset voltage of the integration capacitor 34. The $G_i$ output of the output terminal 61 keeps high until the pixel's electric charge has been sufficiently read out, and then the output becomes low at the timing of $T_i'$, thereby ending the selection of the pixel of the i-th line. Furthermore, at timing $T_i'$, the output of the Reset terminal 37 becomes high, and the integration of the integration capacitor 34 finishes. Immediately before the integration finishes, the SHS terminal 43 becomes temporarily high, and the voltage of the integration capacitor 34 is held by the hold capacitor 41. During the period between timing $T_i'$ and $T_{i+2}$, the clock pulse is applied to the CLK terminal 46, and voltages held by the hold capacitors 39 and 41 are sequentially outputted to the amplifiers 47 and 49 by the for reset signal multiplexer 44 and the readout signal multiplexer 45.

The readout circuit 24 repeats the above operations, thereby reading out the electric charge of all pixels of the FPD 1.

Next, operations of an image pickup apparatus according to this embodiment will be described with reference to FIG. 2.

When conducting radiography, an operating switch 18 used for operating an image pickup apparatus is operated by a two-step operation. The first-step switch operation generates the radiographing preparation request signal (signal which activates devices in the X-ray generator 19 so that the X-ray generator becomes ready for radiating an X-ray) to request the X-ray generator 19 for the preparation of X-ray generation. The second-step switch operation generates the radiation exposure request signal to request the X-ray generator 19 to radiate an X-ray. In an image pickup apparatus disclosed in the previously described patent document 1, bias voltage is applied to the FPD's photoelectric conversion element according to the generation of the radiographing preparation request signal. However, in this embodiment, bias voltage has also been applied to the photoelectric conversion element before the radiographing preparation request signal is generated.

In FIG. 2, when the power to the image pickup apparatus is turned on, the CPU 31 that also functions as a power control section operates a first bias circuit 25, second bias circuit 26 and an FPD controller 30. The output voltage of the first bias circuit 25 is applied to the anode electrode of all of the photoelectric conversion elements 3 via the bias line 15. Furthermore, the CPU 31 controls the FPD controller 30 so that a high signal is inputted into the AO terminal of the gate driver circuit 23, thereby applying VDD voltage to all of the output terminals $G_1, G_2, \ldots G_{N+1}$ of the gate driver circuit 23. Therefore, all of the thin-film transistors 2 and 20$a$, 20$b$, ..., 20$c$ are conducting, and the output voltage of the second bias circuit is applied to the cathode electrode of all photoelectric conversion elements 3.

Therefore, the photoelectric conversion element 3 is reversely biased thereby initializing (reset operation) the electric charge.

In this condition, to save electric power, the readout circuit 24, differential amplifier 27, A/D converter 28 and the memory 29 that do not have to be operated are turned off.

After that, when a radiographer turns on the operating switch 18 to execute the first-step operation, in order to become ready for the subsequent initialization scanning and the readout scanning, the CPU 31 applies VEE voltage to all of the output terminals $G_1, G_2, \ldots G_{N+1}$ of the gate driver circuit 23 and turns off all of the thin-film transistors 2 and 20$a$, 20$b$, ..., 20$c$ thereby stopping the initialization. Then, the CPU 31 starts operating the readout circuit 24, differential amplifier 27, A/D converter 28 and the memory 29. After that, as in the same manner as the conventional technology described in FIG. 9, the CPU 31 sequentially applies VDD voltage to the scanning lines to sequentially select pixel lines thereby conducting the initialization scanning. Subsequently, the CPU 31 generates the radiation exposure request signal to the X-ray generator 19 according to the second-step operation of the operating switch 18, and after the X-ray has been radiated, the CPU 31 sequentially applies VDD voltage to the scanning lines to select pixel lines thereby conducting the readout scanning to read out a picked up image.

Therefore, in this embodiment, after the power to this image pickup apparatus has been turned on, the power control section turns off the operation of the readout circuit 24 before the radiographing preparation request signal is generated, and thin-film transistors 2 and 20$a$, 20$b$, ..., 20$c$ are in the ON state and the first bias circuit 25 and the second bias circuit 26 are operated.

Therefore, for example, if the power to this image pickup apparatus is turned on before business operation starts which is long before radiography is conducted, it is also long before the first-step operation of the operating switch 18 is conducted and the radiographing preparation request signal is generated. Therefore, there is enough time for the FPD 1 to be sufficiently initialized and enough time for fully discharging dark current components stored in the photoelectric conversion element 3, specifically the electric charge trapped at the trap level. Also in this condition, the readout circuit 24 which consumes a large amount of power as well as the differential amplifier 27, A/D converter 28 and the memory 29 which do not have to be operated are turned off; consequently, almost no power is consumed. Therefore, this image pickup apparatus can be driven by a battery.

Moreover, if the CPU 31 is in the low current consumption state during the period after the power to the image pickup apparatus has been turned on and before the operating switch 18 is operated, it is possible to further reduce power consumption. In an alternative method, it is possible to provide another small, low power consuming CPU in addition to the CPU 31 so that the additional CPU can control the image pickup apparatus before the operating switch 18 is operated, thereby reducing power consumption.

In this embodiment, the reset line 16 is connected to the gate driver circuit 23 which drives the reset line 16. Therefore, according to this embodiment, no special circuit is necessary to drive the reset line 16, which makes it possible to provide a small and inexpensive image pickup apparatus.

In this embodiment, during the period after the power to the image pickup apparatus has been turned on and before the second-step operation of the operating switch 18 is conducted, the first bias circuit 25 and the second bias circuit 26 are in operation. Although this configuration facilitates control, initialization of the photoelectric conversion element 3 can simply be done without needing to apply reverse bias to the photoelectric conversion element 3 all the time. Therefore, it is possible for the CPU 31 to control the first bias circuit 25 and the second bias circuit 26 to intermittently operate those circuits, thereby intermittently initializing the photoelectric conversion element 3. At this point in time, the CPU 31 functions as a bias control section. In that case, after the power to this image pickup apparatus has been turned on, for example, the initialization can be conducted for one minute at the beginning and then conducted for several seconds every one minute. Of course, during the period when initialization is not conducted, the gate driver circuit 23 and the FPD controller 30 are not in operation, which can further reduce power consumption.

In this embodiment, the output voltage of the second bias circuit 26 is connected to the Vref terminal 36 of the readout IC, and the output voltage of the second bias circuit 26 is supplied as a reference voltage to the readout IC. Therefore, according to this embodiment, a bias circuit for the readout IC is not necessary, and it is possible to provide a small and inexpensive image pickup apparatus.

In this embodiment, a first switch and a second switch are individually comprises thin-film transistors. Therefore, it is possible to produce FPDs with a large number of pixels at low production costs and high yield rates.

In this embodiment, the proportion of the gate width of the thin-film transistor 20$a$, 20$b$, ..., 20$c$ to the gate length is smaller than the proportion of the gate width of the thin-film transistor 2 to the gate length. Therefore, the OFF resistance of the thin-film transistor 20$a$, 20$b$, ..., 20$c$ is larger than that of the thin-film transistor 2, and current leakage in the OFF state is also small; accordingly, current that has been read out from the photoelectric conversion element 3 would not leak through the thin-film transistor 20$a$, 20$b$..., 20$c$; consequently, high-accuracy readout is possible. Moreover, to increase the OFF resistance of the thin-film transistor 20$a$, 20$b$, ..., 20$c$ so that it becomes larger than that of the thin-film transistor 2, it is possible to use a double-gated, thin-film transistor for the thin-film transistor 20$a$, 20$b$, ..., 20$c$.

In this embodiment, a high signal is inputted into the AO terminal of the gate driver circuit 23 so as to apply VDD voltage to all of the output terminals $G_1, G_2, \ldots G_{N+1}$ of the gate driver circuit 23. However, to turn the output voltage of the output terminals $G_1, G_2, \ldots G_{N+1}$ to VDD voltage, an alternative method is possible in that the clock pulse is inputted into the CLK terminal while the STVR terminal is high, thereby setting the shift registers SR1, SR2 . . . , SR256, and then the OE terminal 57 is made high.

Second Embodiment

Figure 6:
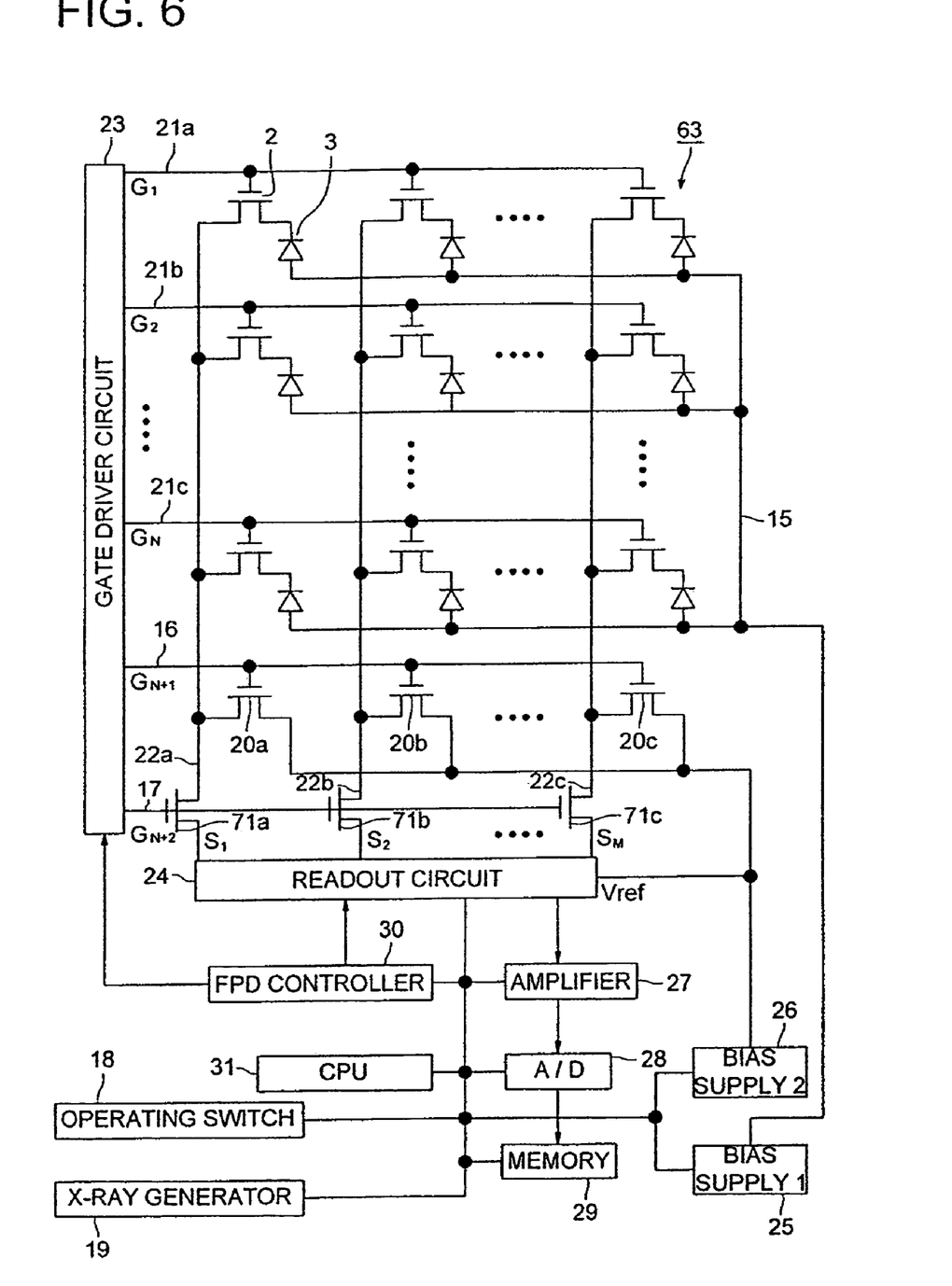
FIG. 6 shows the configuration of a radiation image pickup apparatus according to a second embodiment of the present invention.

FIG. 6 shows the configuration of an image pickup apparatus and an FPD 63 according to a second embodiment of the present invention. In FIG. 6, the difference between the FPD 63 of this embodiment and the FPD 1 of the first embodiment is that the FPD 63 of this embodiment has thin-film transistors 71a, 71b, . . . 71c, each of which functions as a third switch, between readout lines 22a, 22b, . . . 22c and the output terminals $S_1, S_2, \ldots S_M$ of the readout circuit 24, and also has an additional output terminal in the gate driver circuit. The source electrode that functions as one electrode of the thin-film transistor 71a, 71b, . . . 71c is connected to a readout line 22a, 22b, . . . 22c; the drain electrode that functions as another electrode is connected to an output terminal $S_1, S_2, \ldots S_M$ of the readout circuit 24; and the gate electrode that functions as a control electrode is connected to a control line 17 of the third switch. The control line 17 is connected to the output terminal $G_{N+2}$.

The thin-film transistors 71a, 71b, . . . 71c are operated such that they are in the OFF state when the photoelectric conversion element 3 is being initialized, thereby electrically separating the readout lines 22a, 22b, . . . 22c and the output terminals $S_1, S_2, \ldots S_M$.

Next, operations of the image pickup apparatus according to this embodiment will be described.

In FIG. 6, when the power to this image pickup apparatus is turned on, the CPU 31 which also functions as a power control section operates a first bias circuit 25, second bias circuit 26 and an FPD controller 30. The output voltage of the first bias circuit 25 is applied to the anode electrode of all photoelectric conversion elements 3 via a bias line 15. Furthermore, the CPU 31 controls the FPD controller 30 to generate a necessary pulse signal, turns the output voltage of the output terminals $G_1, G_2, \ldots G_{N+1}$ of the gate driver circuit 23 to VDD voltage, and turn the output voltage of the output terminal $G_{N+2}$ to VEE voltage. Therefore, all of the thin-film transistors 2 and 20a, 20b, . . . , 20c are turned on, and then all of the thin-film transistors 71a, 71b, . . . 71c are turned off. Accordingly, the output voltage of the second bias circuit is applied to the cathode electrode of all photoelectric conversion elements 3. Furthermore, the readout lines 22a, 22b, . . . 22c are electrically insulated from the output terminals $S_1, S_2, \ldots S_M$ of the readout circuit 24.

Therefore, the photoelectric conversion element 3 is biased to be in the reverse bias state thereby initializing (reset operation) the electric charge.

In this condition, to save electric power, the readout circuit 24, differential amplifier 27, A/D converter 28 and the memory 29 that do not have to be operated are turned off.

When a radiographer turns on the operating switch 18 to execute the first-step operation, in order to become ready for the subsequent initialization scanning and the readout scanning, the CPU 31 turns the output voltage of output terminals $G_1, G_2, \ldots G_{N+1}$ of the gate driver circuit 23 to VEE voltage, and turns the output voltage of the output terminal $G_{N+2}$ to VDD voltage. Therefore, all of the thin-film transistors 2 and 20a, . . . 20b, 20c are turned off thereby stopping the initialization of the photoelectric conversion element 3; and all thin-film transistors 71a, 71b, . . . 71c are turned on thereby electrically connecting the readout lines 22a, 22b, . . . 22c to the output terminals $S_1, S_2, \ldots S_M$ of the readout circuit 24.

Then, the readout circuit 24, differential amplifier 27, A/D converter 28 and the memory 29 start operating. After that, the CPU 31 sequentially turns the output voltages of the scanning lines to VDD voltage selecting pixel lines thereby conducting the initialization scanning. Subsequently, the CPU 31 generates the radiation exposure request signal to the X-ray generator 19 according to the second-step operation of the operating switch 18, and after the X-ray has been radiated, the CPU 31 sequentially shifts the voltage of the scanning lines at VDD voltage selecting pixel lines thereby conducting the readout scanning to read out a picked up image.

In addition to the characteristics of the first embodiment, this embodiment has a function that electrically insulates readout lines 22a, 22b, . . . 22c from the output terminals $S_1, S_2, \ldots S_M$ of the readout circuit 24 by means of the thin-film transistors 71a, 71b, . . . 71c. As a result, when the photoelectric conversion element 3 is initialized, the output voltage of the second bias circuit 26 is not applied to the terminals $S_1, S_2, \ldots S_M$ of the readout circuit 24.

Generally, in a semiconductor IC circuit, when a voltage higher than the power-supply voltage is applied to an input/output terminal, a current leakage is generated from the input-output terminal to an IC's power-supply terminal. Therefore, unlike this embodiment, if the circuit is not configured such that thin-film transistors 71a, 71b, . . . 71c electrically insulate readout lines 22a, 22b, . . . 22c from the output terminals $S_1, S_2, \ldots S_M$ of the readout circuit 24, then output voltage of the second bias circuit 26 is applied to the output terminals $S_1, S_2, \ldots S_M$ of the readout circuit 24 when the photoelectric conversion element 3 is initialized, which may cause the current to leak to the power supply terminal of the readout circuit 24. If that happens, useless power consumption may occur. For this reason, an IC used in those conditions requires special design to prevent the generation of the current leakage from the input/output terminal to the power supply terminal, which makes the circuit design complicated.

However, in this embodiment, because the output terminals $S_1, S_2, \ldots S_M$ of the readout circuit 24 are electrically insulated when the photoelectric conversion element 3 is initialized, there is no problem with current leakage from those terminals to the power supply terminal. Therefore, according to this embodiment, the degree of free design of the readout IC is increased and also the power to the readout circuit 24 can be turned off to stop operating the readout circuit 24 when the photoelectric conversion element 3 is initialized; consequently, it is possible to stop operating the readout circuit 24 by a simple method.

In this embodiment, as in the same manner as the first embodiment, it is possible to intermittently operate the first bias circuit 25, second bias circuit 26 and the readout circuit 24 thereby intermittently conducting the initialization of the photoelectric conversion element 3.

In this embodiment, the third switch comprises thin-film transistors. Accordingly, it is possible to produce large FPDs with a large number of readout lines at both low production costs and high yield rates. Furthermore, threshold voltages of the thin-film transistors located on the FPD can be the same, which makes it easy to design a gate driver circuit which drives those transistors.

In this embodiment, the proportion of the gate width of the thin-film transistor 71a, 71b, . . . 71c to the gate length is made larger than the proportion of the gate width of the thin-film transistor 2 to the gate length. Therefore, the ON resistance of the thin-film transistor 71a, 71b, . . . 71c is smaller than that of the thin-film transistor 2, and the voltage decrease in the ON state is small; accordingly, it is possible to efficiently read out the electric charge stored in the photoelectric conversion element 3.

Third Embodiment

Figure 7:
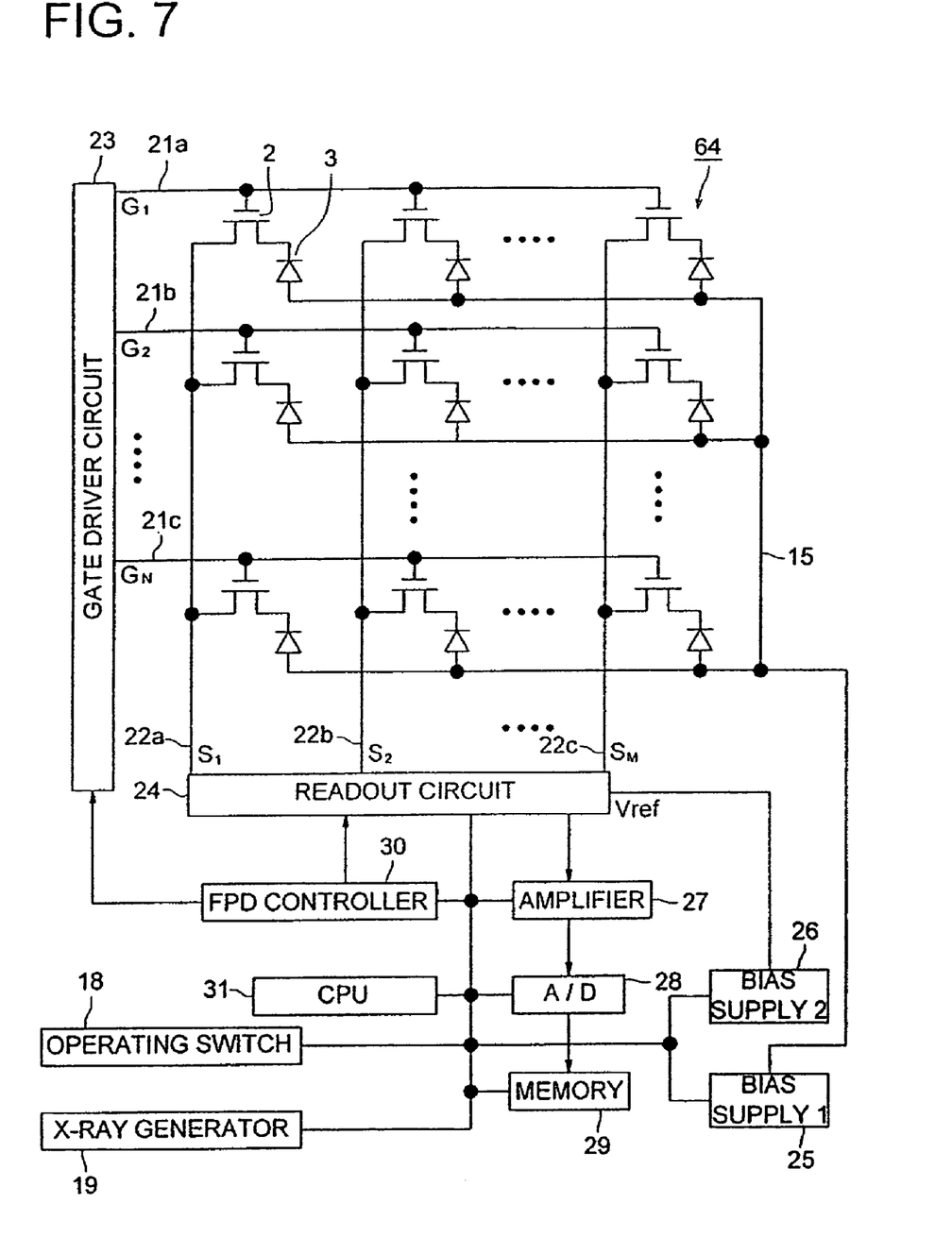
FIG. 7 shows the configuration of a radiation image pickup apparatus according to a third embodiment of the present invention.

FIG. 7 shows the configuration of an image pickup apparatus and an FPD 64 of a third embodiment. In FIG. 7, the difference between this embodiment and the first embodiment is that an FPD 64 of this embodiment is different from the FPD 1 of the first embodiment; the FPD 64 of this embodiment does not have thin-film transistors 20a, 20b, . . . 20c which were included in the first embodiment. Accordingly, the number of output terminals of the gate driver circuit is one less, which are denoted as $G_1, G_2, \ldots G_N$.

Operations of this embodiment will be explained.

In FIG. 7, when the power to the image pickup apparatus is turned on, the CPU 31, which also functions as a power control section and an intermittent operation control section, operates a first bias circuit 25, second bias circuit 26, readout circuit 24 and an FPD controller 30. The output voltage of the first bias circuit 25 is applied to the anode electrode of all photoelectric conversion elements 3 via a bias line 15. Furthermore, the CPU 31 controls the FPD controller 30 to generate a necessary pulse signal, turn the output voltage of the output terminals $G_1, G_2, \ldots G_N$ of the gate driver circuit 23 to VDD voltage. Therefore, all of the thin-film transistors 2 are turned on, and the output voltage of the second bias circuit is applied to the cathode electrode of all of the photoelectric conversion elements 3.

Therefore, the photoelectric conversion element 3 is biased to be in the reverse bias state thereby initializing (reset operation) the electric charge.

In this condition, to save electric power, the readout circuit 24, differential amplifier 27, A/D converter 28 and the memory 29 that do not have to be operated are turned off.

In this condition, initialization is conducted for a given period in time, for example, one minute; the CPU 31 will then stop operating the first bias circuit 25, second bias circuit 26, readout circuit 24 and the FPD controller 30; and the CPU 31 turns the output voltage of the output terminals $G_1, G_2, \ldots G_{N+1}$ of the gate driver circuit 23 to VEE voltage thereby turning off the thin-film transistors 2. Consequently, initialization of the photoelectric conversion element 3 is stopped.

After that, the CPU 31 operates the first bias circuit 25, second bias circuit 26, readout circuit 24 and the FPD controller 30 for several seconds at given intervals, for example, at one-minute intervals; and the CPU 31 turns the output voltages of the output terminals $G_1, G_2, \ldots G_N$ of the gate driver circuit 23 to VDD voltage thereby turning on the thin-film transistors 2. Consequently, initialization of the photoelectric conversion element 3 is conducted.

During that period, if a radiographer executes the first-step operation of the operating switch 18, the image pickup apparatus operates in two ways depending on whether the operating switch 18 is operated while the photoelectric conversion element 3 is being initialized or not being initialized.

If the operating switch 18 is operated while the photoelectric conversion element 3 is being initialized, in order to become ready for the subsequent initialization scanning and the readout scanning, the CPU 31 turns the output voltages of the output terminals $G_1, G_2, \ldots G_N$ of the gate driver circuit 23 to VEE voltage. Accordingly, all thin-film transistors 2 are turned off, thereby stopping the initialization of the photoelectric conversion element 3.

If the operating switch 18 is operated while the photoelectric conversion element 3 is not being initialized, the CPU 31 starts operating the first bias circuit 25 and the second bias circuit 26 that have not been in operation.

In both cases above, the CPU 31 subsequently starts operating the readout circuit 24, differential amplifier 27, A/D converter 28 and the memory 29. After that, the CPU 31 executes the initialization scanning in the same manner as a conventional technology described in FIG. 9, and then generates the radiation exposure request signal to the X-ray generator 19 according to the second-step operation of the operating switch 18, radiates an X-ray, and then executes the readout scanning in the same manner as the conventional technology.

As stated above, the image pickup apparatus of this embodiment intermittently operates the first bias circuit 25, second bias circuit 26 and the readout circuit 24 to initialize the photoelectric conversion element, thereby reducing power consumption.

According to an embodiment of the present invention, when initializing a conversion element, it is possible to apply voltage to the conversion element to execute initialization via a second switch. Consequently, initialization can be fully executed without needing to conduct a scanning operation all the time or without needing to always scan the readout circuit for reading out the signal from the readout line.

According to an embodiment of the present invention, which comprises a bias generation section, readout section, and a scanning section, by operating the bias generation section and turning on the second switch and fully keeping the conversion element in the reverse bias state to conduct initialization, it is possible to fully discharge dark current components, specifically electric charge trapped at the trap level; accordingly, the radiation image pickup apparatus can pick up images with fewer number of noise components. Furthermore, since the readout section can stop operating when the radiation image pickup apparatus is being initialized, it is possible to minimize power consumed by the radiation image pickup apparatus.

According to an embodiment of the present invention, which includes a power control section, because the conversion element is in the full reverse bias state and initialized during the standby state, it is possible to fully discharge dark current components, specifically the electric charge trapped at the trap level; accordingly, the radiation image pickup apparatus can pick up images with fewer number of noise components. Furthermore, since the readout section stops operating in the standby state, it is possible to minimize power consumed by the radiation image pickup apparatus.

According to an embodiment of the present invention, which includes a third switch and a control line thereof, it is possible to separate an external circuit connected to the readout line by turning off the third switch when initializing a conversion element.

According to an embodiment of the present invention, which includes a readout section and a scanning section, it is possible to separate the readout section connected to the readout line by turning off the third switch when initializing a conversion element.

According to an embodiment of the present invention, which includes a power control section, since the readout section can stop operating and allow a bias generation section to operate to initialize the conversion element in the standby state, it is possible to minimize power consumed by the radiation image pickup apparatus.

According to an embodiment of the present invention, which includes a bias generation section, because the bias generation section includes a first bias generation section connected to the first electrode of the conversion element and a second bias generation section connected to the other end of the above second switch, it is possible to individually apply arbitrary voltage to the first electrode of the conversion element and the other end of the second switch.

According to an embodiment of the present invention wherein the reset line is connected to the scanning section, it is possible to control a second switch by means of a simple circuit.

According to an embodiment of the present invention, which includes a bias control section that intermittently operates a bias generation section, it is possible to provide a low power consuming radiation image pickup apparatus.

According to an embodiment of the present invention wherein bias voltage generated by a second bias generation section is supplied as a reference voltage to the readout section, it is possible to eliminate a power supply for supplying reference voltage to the readout section. As a result, it is possible to provide a small, simple and low power consuming radiation image pickup apparatus.

According to an embodiment of the present invention wherein a first and a second switch individually comprise thin-film transistors, it is possible to provide an inexpensive radiation image pickup apparatus because a part of the production procedure can be shared by that of the conversion element and the production procedure can be simplified.

According to an embodiment of the present invention wherein the proportion of the gate width of the second switch to the gate length is smaller than the proportion of the gate width of the first switch to the gate length, the OFF resistance of the second switch is larger than that of the first switch. Accordingly, when reading out the electric charge integrated by a conversion element, current leakage from the second switch is small and a highly accurate readout is possible. Consequently, the radiation image pickup apparatus can pick up images with fewest errors.

According to an embodiment of the present invention wherein a second switch comprises double-gated, thin-film transistors, the OFF resistance of the second switch is high, and when reading out the electric charge integrated by a conversion element, current leakage from the second switch is small and high-accuracy readout is possible. Consequently, the radiation image pickup apparatus can pick up images with fewest errors.

According to an embodiment of the present invention wherein the control line is connected to the scanning section, the radiation image pickup apparatus does not need to include a circuit for driving the control line. For this reason, it is possible to provide a small, simple and low power consuming radiation image pickup apparatus.

According to an embodiment of the present invention wherein a third switch comprises thin-film transistors, it is possible to provide an inexpensive, simple and reliable radiation image pickup apparatus because a part of the production procedure can be shared by that of the conversion element and the first and second switch.

According to an embodiment of the present invention wherein the proportion of the gate width of the third switch to the gate length is larger than the proportion of the gate width of the first switch to the gate length, the ON resistance of the third switch is smaller than that of the first switch. Accordingly, the electric charge of the conversion element can be efficiently read out. Consequently, the radiation image pickup apparatus can pick up images with fewest errors.

According to an embodiment of the present invention wherein the readout section intermittently operates in the standby state and initializes the conversion element, it is possible to minimize the power consumed by a radiation image pickup apparatus.

While the preferred embodiments of the present invention have been described using specific terms, such description is for illustrative purpose only, and it is to be understood that changes and variations may be made without departing from the spirit or scope of the appended claims.

What is claimed is:

1. A radiation image pickup apparatus, comprising:
   a plurality of conversion elements for directly or indirectly converting a radiation ray to an electric signal, wherein each of the plurality of conversion elements comprises a first electrode and a second electrode;
   a plurality of first switches, wherein each of the plurality of first switches comprises one end and an other end and wherein each one end of the plurality of first switches is connected to corresponding ones of the second electrodes of the plurality of the conversion elements, the plurality of first switches together with the corresponding ones of the plurality of conversion elements constituting pixels and being arranged in a matrix;
   a plurality of readout lines, wherein each one of the plurality of readout lines defines a column and is connected to the other ends of the plurality of first switches of the pixels that are associated with the column;
   a plurality of scanning lines for scanning, wherein each one of the plurality of scanning lines defines a row and is used to control the plurality of first switches of the pixels that are associated with the row;
   a plurality of second switches, wherein each of the plurality of second switches comprises one end and an other end and wherein each one end of the plurality of second switches is connected to each of the plurality of readout lines, the other end of the second switch being supplied with a bias voltage for resetting the pixels;
   a reset line for controlling the plurality of second switches;
   a bias generation section which is connected between each first electrode of the plurality of conversion elements and each other end of the plurality of second switches,
   a readout section which is connected to the plurality of readout lines and reads out electric charge by converting the electric charge to a voltage,
   a scanning section which is connected to the plurality of scanning lines and scans the plurality of scanning lines; and
   a power control section for controlling the readout section, the bias generation section, the plurality of scanning lines and the reset line, and for causing, in a standby state, a situation where an operation of the readout section is interrupted, the first and second plurality of switches are on and the bias generation section is in operation.

2. The radiation image pickup apparatus of claim 1, wherein the bias generation section includes a first bias generation section connected to the first electrodes of the plurality of conversion elements and a second bias generation section connected to the other ends of the plurality of second switches.

3. The radiation image pickup apparatus of claim 2, wherein a bias voltage generated by the second bias generation section is supplied to the readout section as a reference voltage.

4. The radiation image pickup apparatus of claim 1, wherein the reset line is connected to the scanning section.

5. The radiation image pickup apparatus of claim 1, comprising:
a bias control section in communication with the bias generation section for making the bias generation section operate intermittently.

6. The radiation image pickup apparatus of claim 1, wherein the first and second plurality of switches include thin film transistors.

7. The radiation image pickup apparatus of claim 6, wherein each of the plurality of first and second switches comprises corresponding first and second gates, wherein a ratio of width to length of each second gate of the second plurality of switches is smaller than a ratio of width to length of each first gate of the first plurality of switches.

8. The radiation image pickup apparatus of claim 6, wherein each of the second plurality of switches includes a double gate thin film transistor.

9. A radiation image pickup apparatus, comprising:
a plurality of conversion elements for directly or indirectly converting a radiation ray to an electric signal;
a plurality of first switches, wherein each of the plurality of first switches comprises one end and an other end and wherein each one end of the plurality of first switches is connected to corresponding ones of the plurality of the conversion elements, the plurality of first switches together with the corresponding ones of the plurality of conversion elements constituting pixels and being arranged in a matrix;
a plurality of readout lines, wherein each one of the plurality of readout lines defines a column and is connected to the other ends of the plurality of first switches of the pixels that are associated with the column;
a plurality of scanning lines for scanning, wherein each one of the plurality of scanning lines defines a row and is used to control the plurality of first switches of the pixels that are associated with the row;
a plurality of second switches, wherein each of the plurality of second switches comprises one end and an other end and wherein each one end of the plurality of second switches is connected to each of the plurality of readout lines, each other end of the plurality of second switches being supplied with a bias voltage for resetting the pixels;
a reset line for controlling the plurality of second switches;
a plurality of third switches, each of which is connected to a corresponding one of the plurality of readout lines; and
a control line for controlling the plurality of third switches.

10. The radiation image pickup apparatus of claim 9, wherein each of the plurality of conversion elements comprises a first electrode and a second electrode, wherein each second electrode of the plurality of conversion elements is connected to a corresponding one end of the plurality of first switches,
wherein the radiation image pickup apparatus further comprises:
a bias generation section which is connected between each first electrode of the plurality of conversion elements and each other end of the plurality of second switches;
a readout section which is connected to the plurality of readout lines and reads out electric charge by converting the electric charge to a voltage; and
a scanning section which is connected to the plurality of scanning lines and scans the plurality of scanning lines.

11. The radiation image pickup apparatus of claim 10, comprising:
a power control section for controlling the readout section, the bias generation section, the plurality of scanning lines, the reset line and the control line and for causing, in a standby state, a situation where operation of the readout section is interrupted, the first and second plurality of switches are on, the third plurality of switches and the bias generation section is in operation.

12. The radiation image pickup apparatus of claim 10, wherein the bias generation section includes a first bias generation section connected to the first electrodes of the plurality of conversion elements and a second bias generation section connected to the other ends of the plurality of second switches.

13. The radiation image pickup apparatus of claim 10, wherein the reset line is connected to the scanning section.

14. The radiation image pickup apparatus of claim 10, comprising:
a bias control section in communication with the bias generation section for making the bias generation section operate intermittently.

15. The radiation image pickup apparatus of claim 10, wherein the control line is connected to the scanning section.

16. The radiation image pickup apparatus of claim 9, wherein each of the plurality of third switches includes a thin film transistor.

17. The radiation image pickup apparatus of claim 16, wherein each of the plurality of first and third switches comprises corresponding first and third gates, wherein a ratio of width to length of each third gate of the third plurality of switches is greater than a ratio of width to length of each first gate of the first plurality of switches.

18. A radiation image pickup apparatus, comprising:
a plurality of conversion elements for directly or indirectly converting a radiation ray to an electric signal, wherein each of the plurality of conversion elements comprises a first electrode and a second electrode;
a plurality of first switches, wherein each of the plurality of first switches comprises one end and an other end and wherein each one end of the plurality of first switches is connected to corresponding ones of the first electrodes of the plurality of the conversion elements, the plurality of first switches together with corresponding ones of the plurality conversion elements constituting pixels and being arranged in a matrix;
a readout line that defines a column and which is connected to the other ends of the plurality of first switches of the pixels that are associated with the column;
a scanning line that defines a row and which is connected to control electrodes of the plurality of first switches of the pixels that are associated with the row;
a bias generation section which is connected to each second electrode of the plurality of conversion elements and supplies a bias voltage;
a readout section which is connected to the readout line and reads out electric charge by converting the electric charge to voltage; and
an intermittent operation control section for, in a standby state, making the readout section operate intermittently.

* * * * *

UNITED STATES PATENT AND TRADEMARK OFFICE
CERTIFICATE OF CORRECTION

PATENT NO. : 7,462,834 B2 Page 1 of 1
APPLICATION NO. : 11/508580
DATED : December 9, 2008
INVENTOR(S) : Naoki Masazumi It is certified that error appears in the above-identified patent and that said Letters Patent is hereby corrected as shown below:

<u>In the Claims</u>

In column 16, claim 1, line 41, immediately after "of second switches" delete "," and substitute --;-- in its place.

In column 16, claim 1, line 44, immediately after "charge to a voltage" delete "," and substitute --;-- in its place.

Signed and Sealed this

Thirtieth Day of June, 2009

JOHN DOLL
*Acting Director of the United States Patent and Trademark Office*